United States Patent
Jaradi et al.

(10) Patent No.: US 11,891,013 B2
(45) Date of Patent: Feb. 6, 2024

(54) SYSTEM INCLUDING SEATBELT ALERT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/746,300

(22) Filed: May 17, 2022

(65) Prior Publication Data
US 2023/0373434 A1    Nov. 23, 2023

(51) Int. Cl.
*B60R 22/48* (2006.01)
*B60R 22/18* (2006.01)
*B60R 22/46* (2006.01)

(52) U.S. Cl.
CPC .............. *B60R 22/48* (2013.01); *B60R 22/18* (2013.01); *B60R 22/46* (2013.01); *B60R 2022/1806* (2013.01); *B60R 2022/4816* (2013.01)

(58) Field of Classification Search
CPC ... B60R 21/0136; B60R 21/18; B60R 21/201; B60R 21/231; B60R 21/235; B60R 22/02; B60R 22/023; B60R 22/20; B60R 22/32; B60R 22/321; B60R 22/322; B60R 22/46; B60R 22/18; B60R 22/48
See application file for complete search history.

(56) References Cited

U.S. PATENT DOCUMENTS

| | | | |
|---|---|---|---|
| 7,797,803 B2 | 9/2010 | Falb et al. | |
| 10,179,563 B2 | 1/2019 | Ammons | |
| 2002/0161501 A1* | 10/2002 | Dulin | B60H 1/00742 701/45 |
| 2006/0097504 A1* | 5/2006 | Akaba | B60R 21/01546 280/806 |
| 2017/0274868 A1* | 9/2017 | Ammons | B60R 22/322 |
| 2019/0344738 A1* | 11/2019 | Ga | B60R 21/01516 |

FOREIGN PATENT DOCUMENTS

KR    101579288 B1    12/2015

OTHER PUBLICATIONS

NPL Search.*

* cited by examiner

*Primary Examiner* — Van T Trieu
(74) *Attorney, Agent, or Firm* — Frank A. MacKenzie; Bejin Bieneman PLC

(57) ABSTRACT

A system includes a seatbelt buckle. The system includes a latch plate releasably engageable with the seatbelt buckle. The system includes an actuator operatively coupled to buckle to trigger disengagement of the latch plate from the seatbelt buckle. The system includes a computer having a processor and a memory storing instructions executable by the processor to detect an impact to a vehicle. The instructions include instructions to, in response to detecting the impact, command the actuator to trigger disengagement of the latch plate from the seatbelt buckle. The instructions include instructions to, after triggering disengagement of the latch plate, detect disengagement of the latch plate from the seatbelt buckle. The instructions include instructions to, in response to detecting disengagement of the latch plate from the seatbelt buckle, actuate an audio device to produce a sound.

15 Claims, 5 Drawing Sheets

SYSTEM INCLUDING SEATBELT ALERT

BACKGROUND

Vehicles typically include one or more seatbelt assemblies. The seatbelt assembly may include a seatbelt retractor and a webbing retractably payable from the seatbelt retractor. The seatbelt assembly may include an anchor coupled to the webbing, and a clip that engages a buckle. The seatbelt assembly may be disposed adjacent a seat. The seatbelt assembly, when fastened, controls the kinematics of occupant of the seat, e.g., during sudden decelerations of the vehicle. The seatbelt assembly may be a three-point harness, meaning that the webbing is attached at three points around the occupant when fastened the anchor, the seatbelt retractor, and the buckle. The seatbelt assembly may, alternatively, include another arrangement of attachment points.

DETAILED DESCRIPTION

Figure 1:
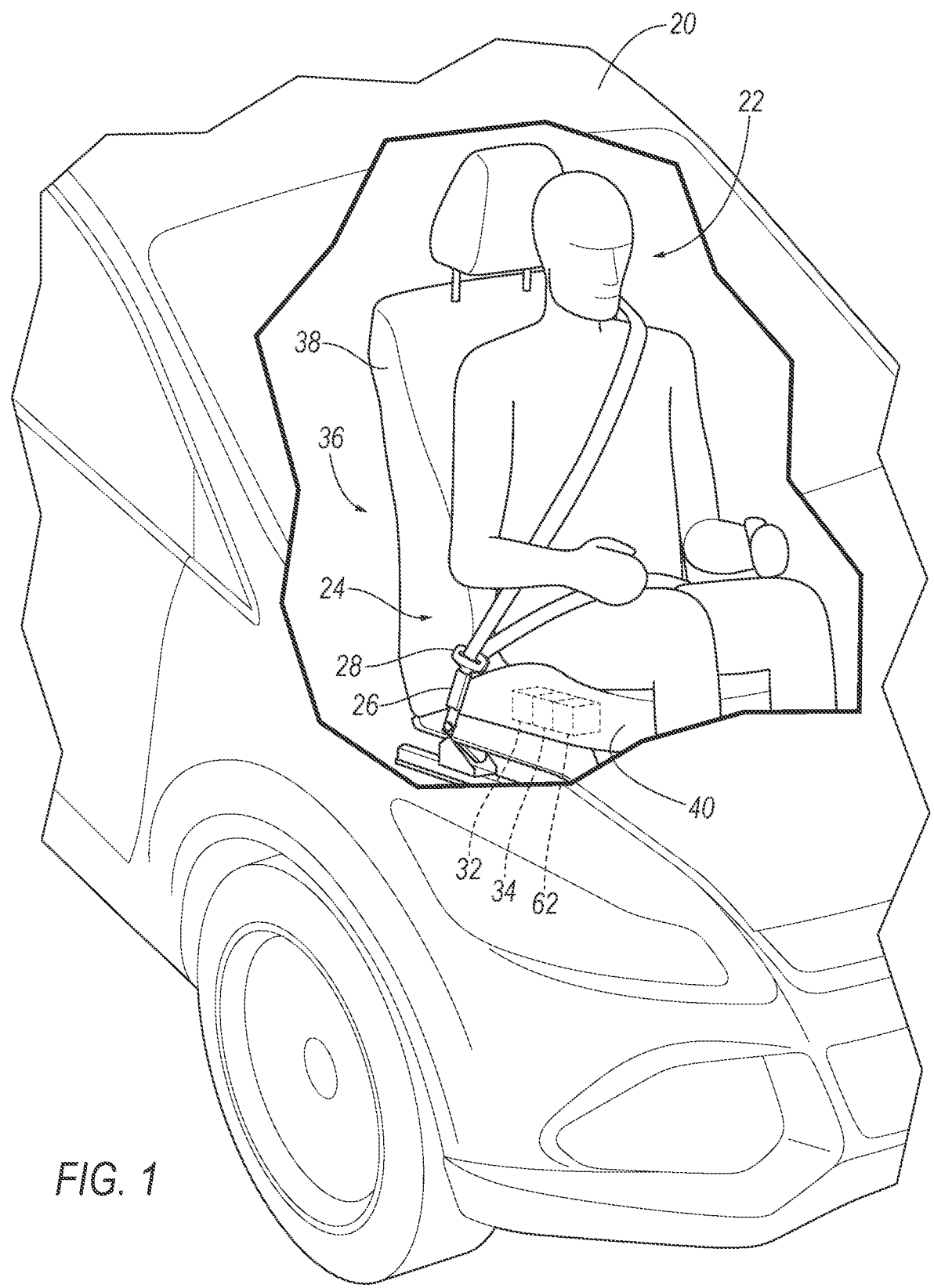
FIG. 1 is a perspective view of an example vehicle with a seatbelt assembly.
Figure 2:
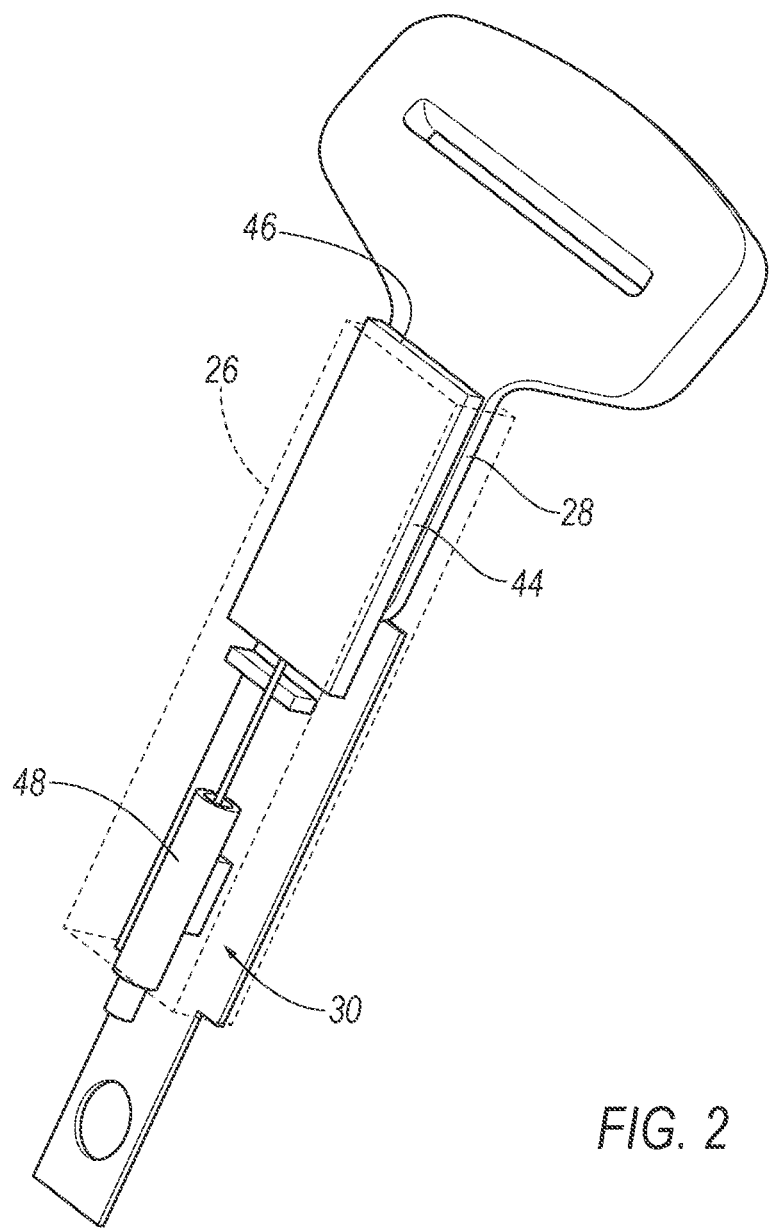
FIG. 2 is a perspective view of a latch plate engaged with a buckle of the seatbelt assembly.
Figure 3:
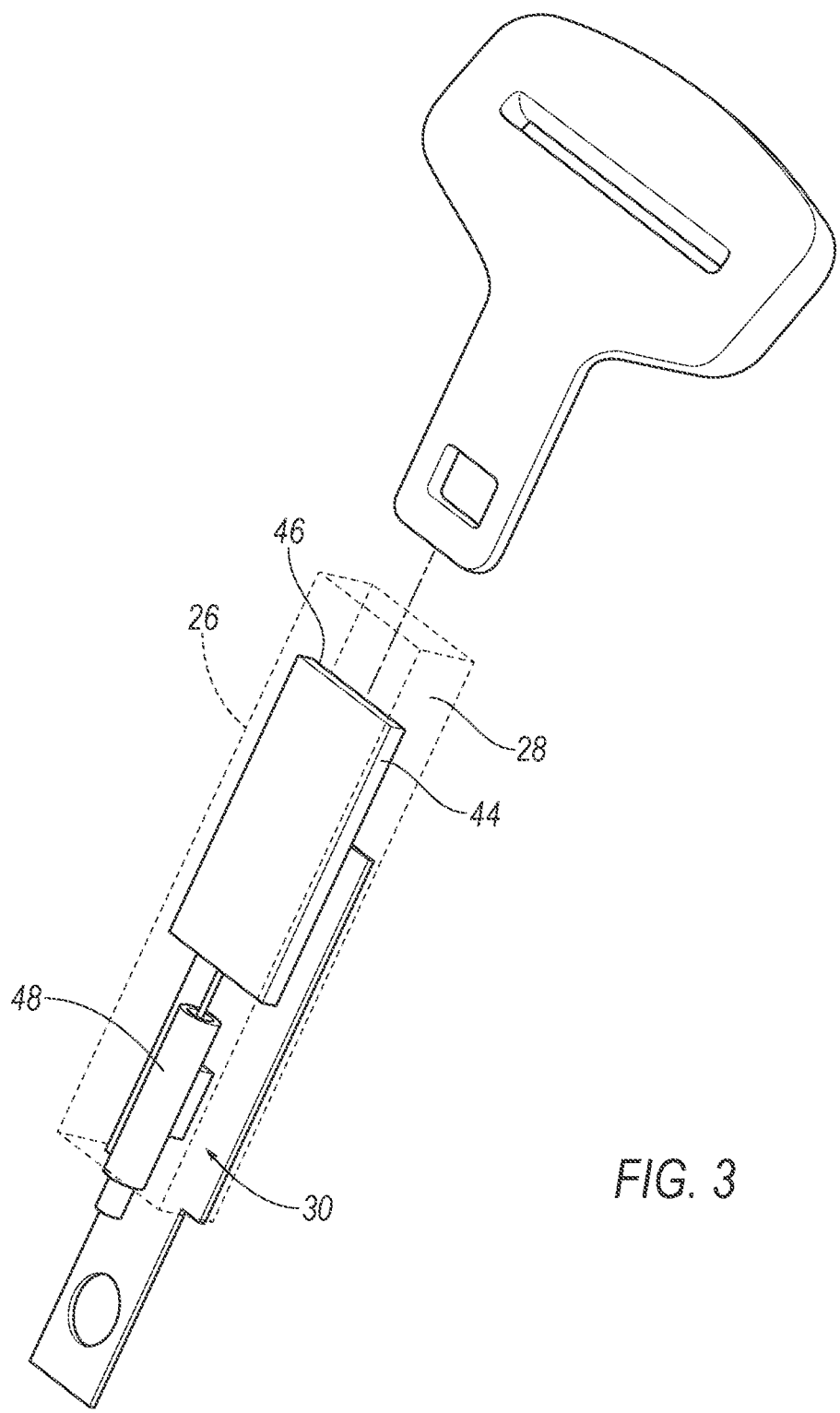
FIG. 3 is a perspective view of the latch plate disengaged from buckle of the seatbelt assembly.

A system includes a seatbelt buckle, a latch plate releasably engageable with the seatbelt buckle, and an actuator operatively coupled to buckle to trigger disengagement of the latch plate from the seatbelt buckle. A computer has a processor and a memory storing instructions executable by the processor to: detect an impact to a vehicle; in response to detecting the impact, command the actuator to trigger disengagement of the latch plate from the seatbelt buckle; after triggering disengagement of the latch plate, detect disengagement of the latch plate from the seatbelt buckle; and in response to detecting disengagement of the latch plate from the seatbelt buckle, actuate an audio device to produce a sound.

The instructions may include instructions to, before detecting the impact and in response to detecting disengagement of the latch plate from the seatbelt buckle, actuate the audio device to produce a second sound. The second sound may be different from the sound. The instructions may include instructions to, before detecting the impact and before detecting disengagement of the latch plate from the seatbelt buckle, detect occupancy of a seat adjacent to the seatbelt buckle.

The system may include a seat and the audio device and the computer may be supported by the seat. The system may include a power source operatively coupled to provide electrical power to the audio device, the actuator, and the computer; and the power source may be supported by the seat.

The instructions may include instructions to, after detecting the impact and before commanding the actuator to trigger disengagement of the latch plate from the seatbelt buckle, determine that the vehicle is stopped.

The sound may include an instruction for occupants to exit the vehicle.

The system may include a seatbelt buckle sensor supported by the seatbelt buckle and configured to detected engagement and disengagement of the latch plate.

The seatbelt buckle may include a release button, and actuator may be operatively coupled to the release button to actuate the release button. The he actuator may include an electromagnetic solenoid.

A computer includes a processor and a memory storing instructions executable by the processor to: detect an impact to a vehicle; in response to detecting the impact, command an actuator to trigger disengagement of a latch plate from a seatbelt buckle; after triggering disengagement of the latch plate, detect disengagement of the latch plate from the seatbelt buckle; and in response to detecting disengagement of the latch plate from the seatbelt buckle, actuate an audio device to produce a sound.

The instructions may include instructions to, before detecting the impact and in response to detecting disengagement of the latch plate from the seatbelt buckle, actuate the audio device to produce a second sound. The second sound may be different from the sound. The instructions may include instructions to, before detecting the impact and before detecting disengagement of the latch plate from the seatbelt buckle, detect occupancy of a seat adjacent to the seatbelt buckle.

The instructions may include instructions to, after detecting the impact and before commanding the actuator to trigger disengagement of the latch plate from the seatbelt buckle, determine that the vehicle is stopped.

The sound includes an instruction for occupants to exit the vehicle.

With reference to the Figures, wherein like numerals indicate like parts throughout the several views, a vehicle 20 with a system 22 for controlling operation of a seatbelt assembly 24 is shown. The system 22 includes a seatbelt buckle 26 and a latch plate 28 engageable with the seatbelt buckle 26. The system 22 includes an actuator 30 operatively coupled to seatbelt buckle 26 to trigger disengagement of the latch plate 28 from the seatbelt buckle 26. The system 22 includes a computer 32 having a processor and a memory storing instructions executable by the processor to detect an impact to the vehicle 20. The instructions include instructions to, in response to detecting the impact, command the actuator 30 to trigger disengagement of the latch plate 28 from the seatbelt buckle 26, then, after triggering disengagement of the latch plate 28, detect disengagement of the latch plate 28 from the seatbelt buckle 26. The instructions include instructions to, in response to detecting disengagement of the latch plate 28 from the seatbelt buckle 26, actuate an audio device 34 to produce a sound.

Disengagement of the latch plate 28 from the seatbelt buckle 26 may enhance ease at which an occupant may exit from the vehicle 20, e.g., without requiring the occupant locate and actuate the seatbelt buckle 26 to release the latch plate 28. Actuation of the audio device 34 to produce the sound may alert the occupant the latch plate 28 is disengaged, e.g., which may be particularly useful to an occupant with impaired vision who may otherwise have difficulty locating and releasing the latch plate 28 from the seatbelt buckle 26 and identifying that the latch plate 28 is disengaged.

The vehicle 20 may be any suitable type of ground vehicle, e.g., a passenger or commercial automobile such as a sedan, a coupe, a truck, a sport utility, a crossover, a van, a minivan, a taxi, a bus, etc.

The vehicle 20 defines a passenger compartment to house occupants, if any, of the vehicle 20. The passenger compartment may extend across the vehicle 20, i.e., from one side to the other side of the vehicle 20. The passenger compartment includes a front end and a rear end with the front end being in front of the rear end during forward movement of the vehicle 20.

One or more seats 36 may be supported by the vehicle 20 in the passenger compartment. Each seat 36 includes a seatback 38 and a seat bottom 40. The seatback 38 may be supported by the seat bottom 40 and may be stationary or movable relative to the seat bottom 40. The seatback 38 and the seat bottom 40 may be adjustable in multiple degrees of freedom. Specifically, the seatback 38 and the seat bottom 40 may themselves be adjustable, in other words, adjustable components within the seatback 38 and/or the seat bottom 40, and/or may be adjustable relative to each other. The seatback 38 and the seat bottom 40 may each include a frame and a covering supported on the frame. The frame may include tubes, beams, etc. The frame may be of any suitable plastic material, e.g., carbon fiber reinforced plastic CFRP, glass fiber-reinforced semi-finished thermoplastic composite organosheet, etc. As another example, some or all components of the frame may be formed of a suitable metal, e.g., steel, aluminum, etc. The covering may include upholstery and padding. The upholstery may be cloth, leather, faux leather, or any other suitable material. The upholstery may be stitched in panels around the frame. The padding may be between the covering and the frame and may be foam or any other suitable material.

The vehicle 20 includes or more seatbelt assemblies 24. Each seatbelt assembly 24 may include a seatbelt retractor and a webbing retractably payable from the seatbelt retractor. The seatbelt assembly 24 may include an anchor coupled to the webbing. The seatbelt assembly 24 may include the latch plate 28. The latch plate 28 is engageable with the seatbelt buckle 26. The seatbelt assembly 24 may be disposed adjacent the seat 36. The seatbelt assembly 24, when fastened, controls the kinematics of occupant of the seat 36, e.g., during sudden decelerations of the vehicle 20. The webbing may extend continuously from the seatbelt retractor to the anchor. For example, one end of the webbing feeds into the seatbelt retractor, and the other end of the webbing is fixed to the anchor. The anchor may, for example, be fixed to the seat 36. Alternatively, the anchor may be fixed to a vehicle body, e.g., a B-pillar, a floor, etc. The anchor may be attached to the seat 36 in any suitable manner, e.g., with fasteners. The webbing may be fabric, e.g., woven nylon. The latch plate 28 slides freely along the webbing and, when engaged with the seatbelt buckle 26 28, divides the webbing into a lap band and a shoulder band. The seatbelt assembly 24 may include a D-ring engaged with the webbing. For example, the webbing may freely slide through the D-ring. In other words, the webbing may extend from the anchor through the D-ring to the seatbelt retractor. The D-ring may be spaced from the seatbelt retractor. For example, the D-ring may be disposed between the seatbelt retractor and the roof. As another example, the seatbelt retractor may be adjacent to the floor and the D-ring may be adjacent to the roof. The D-ring may be fixed to the vehicle body, e.g., the B-pillar. The seatbelt assembly 24 may be a three-point harness, meaning that the webbing is attached at three points around the occupant when fastened the anchor, the seatbelt retractor, and the seatbelt buckle 26. The seatbelt assembly 24 may, alternatively, include another arrangement of attachment points.

The seatbelt buckle 26 releasably engages the latch plate 28. The seatbelt buckle 26 may include, for example, a slot 42, a latch 44, a release button 46, or other suitable structure.

The release button 46 may be spring loaded, as is known. The latch plate 28 may be engaged with the seatbelt buckle 26 upon insertion into the slot 42. For example, the latch 44 may engage an opening defined by the latch plate 28 and inhibit removal of the latch plate 28 from the slot 42. Actuation of the release button 46 may disengage the latch plate 28 from the seatbelt buckle 26. For example, depression of the release button 46 may disengage the latch 44 from the opening defined by the latch plate 28 and permit removal of the latch plate 28 from the slot 42.

The actuator 30 is operatively coupled to the seatbelt buckle 26 to trigger disengagement of the latch plate 28 from the seatbelt buckle 26, e.g., in response to receiving a command from the computer 32. For example, the actuator 30 may be operatively coupled to the release button 46 to actuate, e.g., cause depression of, the release button 46. The actuator 30 may be coupled to the release button 46, e.g., via plate, bar, cable, rod, or any other suitable structure. The actuator 30 may include a linear actuator that changes a length between ends, a servo having a motor and reduction gears, or any other suitable electro-mechanical and/or hydraulic structure. The actuator 30 may include an electromagnetic solenoid 48, e.g., having a wire coil fixed relative to a housing of the seatbelt buckle 26 and a plunger slidable within the coil and operatively coupled to the release button 46 such that movement of the plunger actuates the release button 46. Application of an electric current to the coil, e.g., as commanded by the computer 32, may generate a magnetic field and move the plunger to actuate the release button 46.

The audio device 34 generates sounds perceptible by an occupancy of the vehicle 20, e.g., in response to a command from the computer 32. The audio device 34 may include, for example a speaker, an electric buzzer, a piezoelectric buzzer, or any other suitable structure of generating sound. The audio device 34 may be supported by the seat 36, e.g., fixed to the frame of the seat bottom 40 and underneath the covering.

Figure 4:
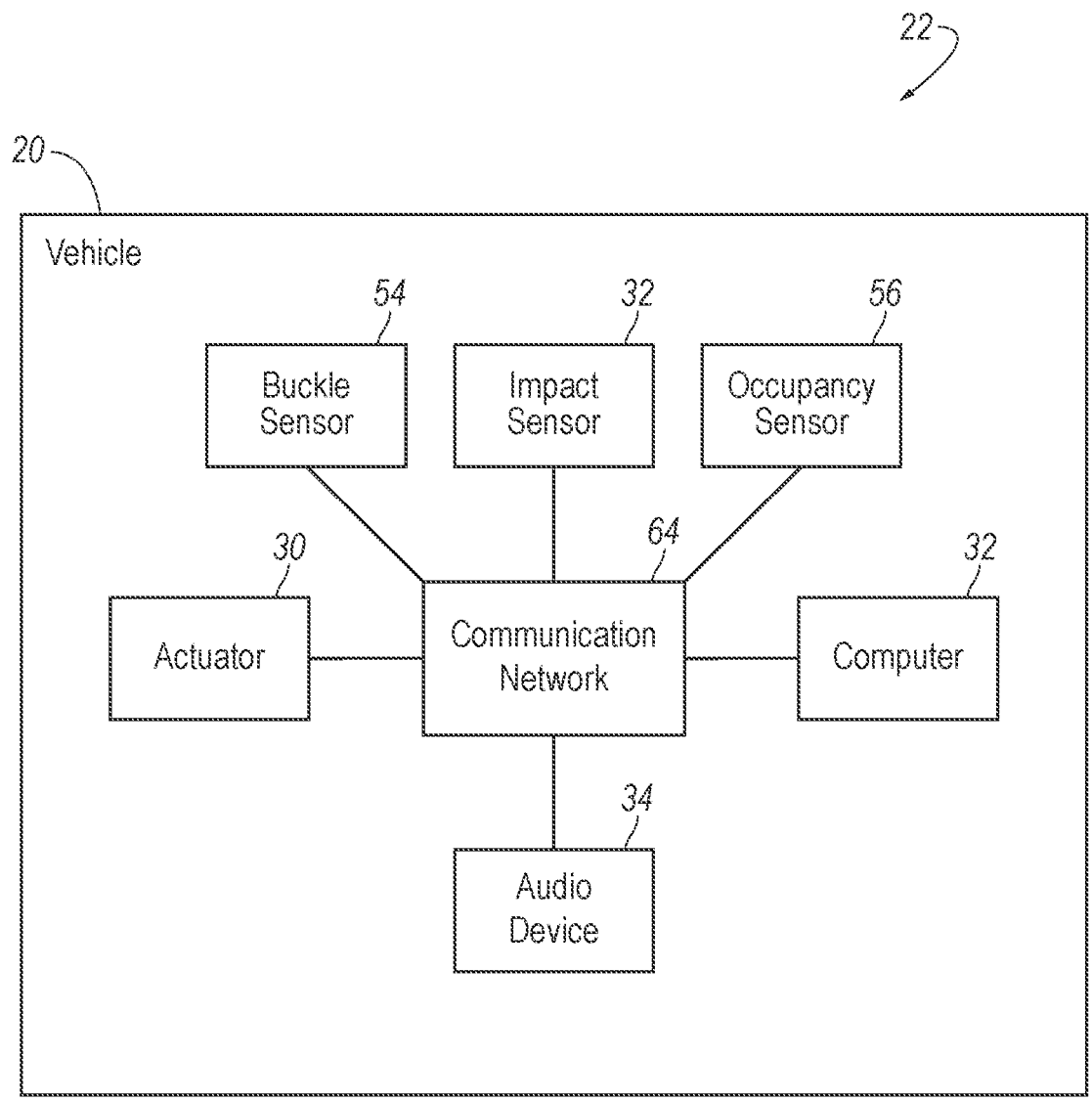
FIG. 4 is a block diagram of components of the vehicle.

With reference to FIG. 4, the seatbelt assembly 24 of the vehicle 20 may include a seatbelt buckle sensor 54 configured to detected engagement and disengagement of the latch plate 28 with the seatbelt buckle 26. The seatbelt buckle sensor 54 may be supported by the seatbelt buckle 26. The seatbelt buckle sensor 54 may include a switch, a contact sensor, a hall effect sensor, or any other suitable structure for detecting engagement and disengagement of the latch plate 28 with the seatbelt buckle 26.

The vehicle 20 may include an occupancy sensor 56 configured to detect occupancy of the seat 36. The occupancy sensor 56 may be visible-light or infrared cameras directed at the seat 36, weight sensors supported by the seat bottom 40, sensors detecting whether the seatbelt assembly 24 for the seat 36 is buckled, or other suitable sensors. The occupancy sensor 56 provides data to the computer 32 specifying whether the seat 36 is occupied or unoccupied.

The vehicle 20 may include an impact sensor 58. The impact sensor 58 is configured to detect an impact to the vehicle 20. The impact sensor 58 may be of any suitable type, for example, post-contact sensors such as accelerometers, pressure sensors, and contact switches; and pre-impact sensor 58s such as radar, LIDAR, and vision-sensing systems. The vision systems may include one or more cameras, CCD image sensors, CMOS image sensors, etc. The impact sensor 58 may be located at numerous points in or on the vehicle 20, The vehicle 20 may include a speed sensor 60 that detect a speed of the vehicle 20. The speed sensor 60 may include, for example, a hall effect sensor that detects passing teeth of a ring gear coupled to a powertrain component, such as an axle shaft, wheel, etc. A number of teeth detected passing in a specified amount of time can be used to calculate a rotational speed of the ring gear and an associated vehicle speed. The speed sensor 60 may include any other suitable structure for detecting the speed of the vehicle 20.

The vehicle 20 may include a power source 62 that provides sufficient electrical power to operate the computer 32, the audio device 34, and the actuator 30. The power source 62 may be a battery, such as a lithium-ion polymer battery, a nickel-metal hydride battery, etc. The power source 62 may be a capacitor. The power source 62 may include any other suitable structure to store and provide electrical power. The power source 62 is operatively coupled to provide electrical power to the audio device 34, the actuator 30, and the computer 32, e.g., via wires or any other suitable structure. The power source 62 may be supported by the seat 36, e.g., fixed to the frame of the seat bottom 40 and underneath the covering.

The computer 32 includes a processor and a memory. The memory includes one or more forms of computer 32 readable media, and stores instructions executable by the computer 32 for performing various operations, including as disclosed herein and including the method of a process 500 (described below). For example, the computer 32 can be a generic computer with a processor and memory as described above, may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. The computer may be, for example, a restraints control module. In another example, the computer 32 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 32. The memory can be of any type, e.g., hard disk drives, solid state drives, servers, or any volatile or non-volatile media. The memory can store the collected data sent from the sensors. The memory can be a separate device from the computer 32, and the computer 32 can retrieve information stored by the memory via a communication network 64, e.g., over a CAN bus, a wireless network, etc. Alternatively or additionally, the memory can be part of the computer 32, e.g., as a memory of the computer 32. The computer 32 may include or be communicatively coupled to, e.g., via the communication network 64 such as a communications bus as described further below, more than one processor, e.g., included in components such as sensors, electronic control units (ECUs) or the like included in the vehicle 20 for monitoring and/or controlling various vehicle components, e.g., a powertrain controller, a brake controller, a steering controller, etc. The computer 32 is generally arranged for communications on a communication network 64 that can include a bus in the vehicle 20 such as a controller area network CAN or the like, and/or other wired and/or wireless mechanisms. Alternatively or additionally, in cases where the computer 32 actually comprises a plurality of devices, the communication network 64 may be used for communications between devices represented as the computer 32 in this disclosure. Further, as mentioned below, various controllers and/or sensors may provide data to the computer 32 via the communication network 64. The computer 32 may be supported by the seat 36, e.g., fixed to the frame of the seat bottom 40 and underneath the covering. Supporting the computer 32, the audio device 34, and the power source 62 by the seat 36 may provide robust operation of the system 22.

The communication network 64 is a network via which messages can be exchanged between various devices in vehicle 20. The computer 32 is in electronic communication with, and can be generally programmed to send and/or receive, via communication network 64, messages and other information to and/or from other devices in vehicle 20 e.g., any or all of the computer 32, the actuator 30, the audio device 34, the impact sensor 58, the speed sensor 60, the seatbelt buckle sensor 54, the occupancy sensor 56, etc. In some implementations, communication network 64 can be a network in which messages are conveyed via a vehicle 20 communications bus. For example, communication network 64 can include a controller area network CAN in which messages are conveyed via a CAN bus, or a local interconnect network LIN in which messages are conveyed via a LIN bus. In some implementations, communication network 64 can include a network in which messages are conveyed using other wired communication technologies and/or wireless communication technologies e.g., Ethernet, WiFi, Bluetooth, etc. Additional examples of protocols that may be used for communications over communication network 64 in some implementations include, without limitation, Media Oriented System Transport MOST, Time-Triggered Protocol TTP, and FlexRay. In some implementations, the communication network 64 can represent a combination of multiple networks, possibly of different types, that support communications among devices in vehicle 20. For example, the communication network 64 can include a CAN in which some devices in the vehicle 20 communicate via a CAN bus, and a wired or wireless local area network in which some devices in the vehicle 20 communicate according to Ethernet or Wi-Fi communication protocols.

The computer 32 is programmed to, i.e., the memory stores instruction executable by the processor to, detect an impact to the vehicle 20. The computer 32 may detect the impact. The computer 32 may detect the impact based on information from the impact sensor 58, e.g., received via the communication network 64.

The computer 32 may be programmed to determine whether the vehicle 20 is stopped. The computer 32 may determine whether the vehicle 20 is stopped based on information from the speed sensor 60, e.g., received via the communication network 64. The computer 32 may determine that the vehicle 20 is stopped when the information from the speed sensor 60 indicates that a speed of the vehicle 20 is zero.

The computer 32 may be programmed to command the actuator 30 to trigger disengagement of the latch plate 28 from the seatbelt buckle 26. The command to the actuator 30 may, for example, provide the coil of the solenoid 48 with a sufficient amount of electrical power to generate a magnetic force that can move the plunger cause depression of the release button 46. As another example, the command may instruct a length change of a linear actuator or rotation of a servo operatively coupled to the release button 46. The computer 32 may transmit the command via the communication network 64. The computer 32 may command the actuator 30 to trigger disengagement of the latch plate 28 from the seatbelt buckle 26 in response to detecting an impact to the vehicle 20 and after determining that the vehicle 20 is stopped.

The computer 32 may be programmed to determine that the latch plate 28 is one of engaged with or disengaged from the seatbelt buckle 26, e.g., based on information from the seatbelt buckle sensor 54 received via the communication network 64. For example, the computer 32 may determine that the latch plate 28 is engaged when information from the seatbelt buckle sensor 54 indicates detection of the latch plate 28 in the slot 42. As another example, the computer 32 may determine the latch plate 28 is disengaged from the seatbelt buckle 26 when information from the seatbelt buckle sensor 54 indicates the latch plate 28 is not detected in the slot 42.

The computer 32 may be programmed to determine whether each of the seats 36 is one of occupied or not occupied, e.g., based on information from the occupancy sensor 56 and received via the communication network 64. The computer 32 may determine a seat 36 is occupied when information from the occupancy sensor 56 indicates that an occupant is occupying, e.g., sitting on, such seat 36. The computer 32 may determine a seat 36 is not occupied when information from the occupancy sensor 56 indicates that an occupant not occupying, e.g., not sitting on, such seat 36.

The computer 32 may be programmed to actuate the audio device 34 to produce sound, e.g., a first sound, a second sound, etc. The computer 32 may actuate the audio device 34 to produce sound by transmitting a command to the audio device 34, e.g., via the communication network 64. The command may specify generation of a sound at a certain tone, frequency, etc. The command may specify generation of a sound that includes a verbal communication, e.g., spoken language. The command may include, for example, a verbal communication instructing the occupant to buckle the seatbelt assembly 24, exit the vehicle 20, etc. The computer 32 may acuate the audio device 34 to produce one sound in respond to detecting disengagement of the latch plate 28 from the seatbelt buckle 26, and after detecting an impact to the vehicle 20 and subsequently triggering disengagement of the latch plate 28. The computer 32 may acuate the audio device 34 to produce a different sound before detecting an impact to the vehicle 20 and in response to detecting disengagement of the latch plate 28 from the seatbelt buckle 26.

Figure 5:
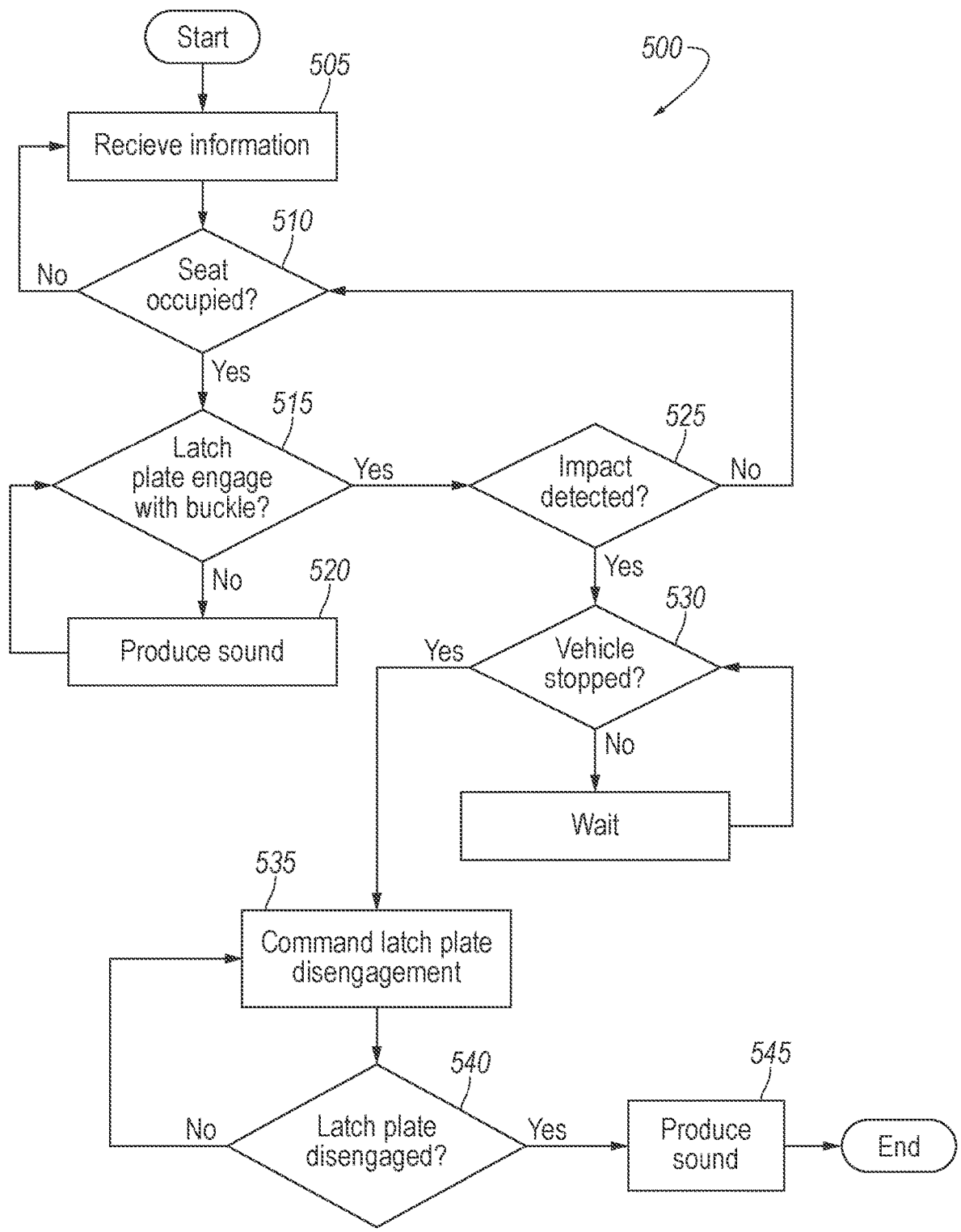
FIG. 5 is a flow chart shown a process for controlling an audio device based on disengagement of the latch palate from the buckle.

FIG. 5 is a process flow diagram illustrating the exemplary process 500 for controlling the actuator 30 and the sound device. The process 500 begins in a block 505, e.g., during normal operation of the vehicle 20 such as when the vehicle 20 is traveling in the forward direction FD, when the vehicle 20 is in a drive mode, etc. At the block 505 the computer 32 receives information, e.g., from the seatbelt buckle sensor 54, the impact sensor 58, the occupancy sensor 56, etc., via the communication network 64. The computer 32 may continue to receive information throughout the process 500. Throughout the process 500 in the present context means substantially continuously or at time intervals, e.g., every 200 milliseconds At a block 510 the computer 32 determines whether a seat 36 of the vehicle 20 is occupied or not occupied, e.g., based on information received from the occupancy sensor 56. In response to determining no seat 36 is occupied, i.e., the seats 36 are not occupied, the computer 32 returns to the block 505. Alternately, the process 500 may end.

At the block 515 the computer 32 determines whether or not a latch plate 28 is engaged with a seatbelt buckle 26 of a seatbelt assembly 24 adjacent the seat 36 determined as occupied at the block 510, e.g., based on information from the seatbelt buckle sensor 54. The seatbelt assembly 24 adjacent the seat 36 determined as occupied controls kinematics of the occupant of such seat 36. In response to detecting the latch plate 28 is not engaged with the seatbelt buckle 26, i.e., detecting disengagement of the latch plate 28 from the seatbelt buckle 26, the computer 32 moves to a block 520. In response to detecting the latch plate 28 is engaged with the seatbelt buckle 26 the computer 32 moves to a block 525.

At the block 520 the computer 32 actuates the audio device 34 to produce a sound, e.g., by transmitting a command specifying the sound to the audio device 34. The sound may indicate to the occupant that the latch plate 28 is not engaged with the seatbelt buckle 26, e.g., as a reminder to seatbelt buckle 26 the seatbelt assembly 24. After the block 520 the computer 32 may return to the block 515.

At the block 525 the computer 32 determines whether an impact to the vehicle 20 has been detected, e.g., based on information received from the impact sensor 58. In response to detecting an impact to the vehicle 20 the computer 32 moves to a block 530. Else, the computer 32 may return to the block 510. Alternately, the process 500 may end.

At the block 530, after detecting the impact at the block 525, the computer 32 determines whether the vehicle 20 is stopped, e.g., based on information from the speed sensor 60. In response to determining the vehicle 20 is stopped the computer 32 moves to a block 535. Else, the computer 32 waits a specified amount of time, e.g., 200 milliseconds, and then repeats the block 530, e.g., iteratively until the vehicle 20 is stopped.

At the block 535 the computer 32 commands the actuator 30 to trigger disengagement of the latch plate 28 from the seatbelt buckle 26, e.g., by sending a command to the actuator 30 via the communication network 64.

Next, at a block 540, the determines whether disengagement of the latch plate 28 from the seatbelt buckle 26 has been detected, e.g., based on information received from the seatbelt buckle sensor 54. In response to detecting the latch plate 28 is disengaged from the seatbelt buckle 26 the computer 32 moves to a block 545. In response to detecting the latch plate 28 is not disengaged from the seatbelt buckle 26, i.e., the latch plate 28 is engaged with the seatbelt buckle 26, the computer 32 returns to the block 535, e.g., iteratively commanding the actuator 30 until disengagement is detected.

At the block 545 the computer 32 the computer 32 actuates the audio device 34 to produce a sound, e.g., by transmitting a command specifying the sound to the audio device 34. The sound commanded at the block 545 may be different than the sound commanded at the block 520. The sound commanded at the block 545 may include an instruction for occupants to exit the vehicle 20, e.g., as a verbal communication. After the block 545 the process 500 may end.

In the drawings, the same reference numbers indicate the same elements. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

Computer executable instructions may be compiled or interpreted from computer programs created using a variety of programming languages and/or technologies, including, without limitation, and either alone or in combination, Java, C, C, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer 36 readable medium, such as a storage medium, a random access memory, etc. A computer 36 readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer 36-readable media include, for example, RAM, a PROM, an EPROM, a FLASH-EEPROM, any other memory chip or cartridge, or any other medium from which a computer can read.

The adjectives first and second are used throughout this document as identifiers and, unless explicitly stated otherwise, are not intended to signify importance, order, or quantity. Use of "in response to," "based on," and "upon" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
   a seatbelt buckle;
   a latch plate releasably engageable with the seatbelt buckle;
   an actuator operatively coupled to buckle to trigger disengagement of the latch plate from the seatbelt buckle; and
   a computer having a processor and a memory storing instructions executable by the processor to:
   detect an impact to a vehicle;
   in response to detecting the impact, command the actuator to trigger disengagement of the latch plate from the seatbelt buckle;
   after triggering disengagement of the latch plate, detect disengagement of the latch plate from the seatbelt buckle;
   in response to detecting disengagement of the latch plate from the seatbelt buckle, actuate an audio device to produce a sound; and
   after detecting the impact and before commanding the actuator to trigger disengagement of the latch plate from the seatbelt buckle, determine that the vehicle is stopped.

2. The system of claim 1, wherein the instructions include instructions to, before detecting the impact and in response to detecting disengagement of the latch plate from the seatbelt buckle, actuate the audio device to produce a second sound.

3. The system of claim 2, wherein the second sound is different from the sound.

4. The system of claim 2, wherein the instructions include instructions to, before detecting the impact and before detecting disengagement of the latch plate from the seatbelt buckle, detect occupancy of a seat adjacent to the seatbelt buckle.

5. The system of claim 1, further comprising a seat, the audio device and the computer supported by the seat.

6. The system of claim 5, further comprising a power source operatively coupled to provide electrical power to the audio device, the actuator, and the computer, and wherein the power source is supported by the seat.

7. The system of claim 1, wherein the sound includes an instruction for occupants to exit the vehicle.

8. The system of claim 1, further comprising a seatbelt buckle sensor supported by the seatbelt buckle and configured to detect engagement and disengagement of the latch plate.

9. The system of claim 1, wherein the seatbelt buckle includes a release button, and the actuator is operatively coupled to the release button to actuate the release button.

10. The system of claim 6, wherein the actuator includes an electromagnetic solenoid.

11. A computer, comprising a processor and a memory storing instructions executable by the processor to:
    detect an impact to a vehicle;
    in response to detecting the impact, command an actuator to trigger disengagement of a latch plate from a seatbelt buckle;
    after triggering disengagement of the latch plate, detect disengagement of the latch plate from the seatbelt buckle;
    in response to detecting disengagement of the latch plate from the seatbelt buckle, actuate an audio device to produce a sound; and
    after detecting the impact and before commanding the actuator to trigger disengagement of the latch plate from the seatbelt buckle, determine that the vehicle is stopped.

12. The computer of claim 11, wherein the instructions include instructions to, before detecting the impact and in response to detecting disengagement of the latch plate from the seatbelt buckle, actuate the audio device to produce a second sound.

13. The computer of claim 12, wherein the second sound is different from the sound.

14. The computer of claim 12, wherein the instructions include instructions to, before detecting the impact and before detecting disengagement of the latch plate from the seatbelt buckle, detect occupancy of a seat adjacent to the seatbelt buckle.

15. The computer of claim 11, wherein the sound includes an instruction for occupants to exit the vehicle.

* * * * *